United States Patent Office 3,833,679
Patented Sept. 3, 1974

3,833,679
PARAFFIN ISOMERIZATION UTILIZING HF TO CHANGE THE SELECTIVITY OF HSbF$_6$ CATALYST
Lloyd E. Gardner and John E. Mahan, Bartlesville, Okla., assignors to Phillips Petroleum Company
No Drawing. Filed July 20, 1972, Ser. No. 273,636
Int. Cl. C07c 5/28
U.S. Cl. 260—683.68                3 Claims

ABSTRACT OF THE DISCLOSURE

Isomerization of paraffins employing HSbF$_6$ catalyst and anhydrous hydrogen fluoride vapor results in increased selectivity.

---

This invention relates to super acid catalysts.

In one of its more specific aspects, this invention relates to the employment of super acids such as HF-SbF$_5$ to isomerize paraffins.

The isomerization of paraffins employing acids is well known. Various reaction conditions are employed depending upon the nature of the acid employed.

The present invention pertains to the establishment of super acids on supports such as alpha-alumina, fluorided alumina, potassium fluoride on alumina, NaF, AlPO$_4$, AlF$_3$, charcoal, and the like, and to the use of such supported acid catalysts for isomerization.

According to the present invention, a support is contacted with SbF$_5$ vapor to saturate the support. The support is then contacted with HF vapor to form the active catalyst. The paraffin feedstock is contacted with the catalyst in the presence of anhydrous hydrogen fluoride vapor. The employment of the anhydrous HF vapor in this manner increases the selectivity of the isomerization.

In one embodiment of the invention the paraffin hydrocarbon is brought into contact with the catalyst in the substantial absence of hydrogen fluoride vapor. The flow of hydrocarbon is then discontinued and hydrogen fluoride is passed into contact with the catalyst to regenerate it. The flow of hydrogen fluoride is then discontinued and the paraffin hydrocarbon is again brought into contact with the catalyst to isomerize the paraffins. This sequence of isomerization and regeneration can be carried out a multiplicity of times.

The antimony pentafluoride can be deposited on the support from a stream of carrier gas such as nitrogen, helium, neon or argon at a temperature within the range of from about 25° C. to about 150° C. and preferably at atmospheric pressure although pressures within the range of 0.5 to 10 atmospheres can be used. The molar ratio of the carrier gas to SbF$_5$ can be within the range of about 1:1 to about 500:1 with a preferred range being 5:1 to 50:1.

The carrier gas containing the SbF$_5$ is passed into contact with the support until the support is saturated. The saturation point is evidenced by the appearance of "smoke" at the outlet from the container in which the support can be positioned during the contacting.

The HF vapor is then brought into contact with the SbF$_5$-containing support using a helium diluent. This treatment can be carried out at those conditions employed for the SbF$_5$ deposition. An amount of HF slightly in excess of that stoichiometric amount required for conversion of the SbF$_5$ to HSbF$_6$ is employed. Excess HF is evidenced by the appearance of "smoke" at the outlet from the container in which the support is positioned during the contacting.

By the above procedure, the support will be made to contain from about 0.9 to about 70 weight percent SbF$_5$ and from about 1 to about 80 weight perecnt HSbF$_6$.

The catalysts of this invention can be used to isomerize paraffins and cycloparaffins having 4 to 12 carbon atoms. Hydrogen, which is employed in the process and suppresses catalyst deactivation, is employed in a molar ratio of hydrogen to hydrocarbon within the range of about 0.1 to about 100, the preferred range being about 1 to about 20. Space velocities within the range of about 200 to about 3500 volumes of total vapor per volume of catalyst per hour are employed at temperatures within the range of from about —80° C. to about 250° C., the preferred range being from about 0° C. to about 50° C.

The catalysts of this invention can be reactivated by treatment with SbF$_5$ vapor at room temperature or by treatment with SbF$_5$ vapor followed by contact with HF.

In the method of this invention, anhydrous HF is injected into the reaction either continuously or intermittently in concentrations of 0.01 to 60 mole perecnt of hydrocarbon feed, HF and hydrogen charged.

The method of the present invention is illustrated by the following examples which represent the best mode for carrying out the invention.

EXAMPLE I

The catalyst used contained 19.9 weight percent HSbF$_6$ on fluorided gamma-alumina.

In the first run, n-hexane contained in the feedstream and hydrogen in the amounts shown were introduced into the reactor.

In the second run, anhydrous hydrogen fluoride was introduced into the reactor along with the paraffin/hydrogen feed.

In both runs, the reaction was conducted at 25° C. and 1 atmosphere pressure. The analyses shown indicate the product stream composition at the end of a 3 hour period. Operating conditions and results were as follows:

| Run number | I | II |
|---|---|---|
| Feed composition, mole percent: | | |
| Hydrogen | 81 | 37 |
| n-Hexane | 19 | 10 |
| Hydrogen fluoride | 0 | 53 |
| Space rate, v./v./hr | 600 | 1,100 |
| Hexane conversion, percent | 21 | 16 |
| Yield, percent of n-C$^6$ converted: | | |
| Isobutane | 33.2 | 1.2 |
| Isopentane | 19.2 | 0.6 |
| 2,2-dimethylbutane and 2,3-dimethylbutane | 7.9 | 9.3 |
| 2-methylpentane | 29.5 | 66.7 |
| 3-methylpentane | 9.8 | 22.2 |

From the above data it can be seen that about equal quantities of n-hexane were passed into contact with the the catalyst during the runs at about the same molar ratios of hydrogen to n-hexane (Run I, 4.25; Run II, 3.7). The presence of the anhydrous HF in the feed (Run II) improved the selectivity for the isomerization of n-hexane to isomers containing the same number of carbon atoms.

The selectivity of the supported catalyst concerned herein can be restored by hydrogen fluoride purge. This is illustrated by the following example.

EXAMPLE II n-Hexane was isomerized by contacting it with a catalyst comprising HSbF$_6$ on alumina, there being no anhydrous hydrogen fluoride introduced with the feedstock which comprised 10.2 weight percent 2-methylpentane and about 89.8 percent n-hexane.

After 60 minutes on stream, the catalyst was contacted with a stream of helium containing anhydrous HF until the catalyst was saturated with HF. Contact of the feedstock with the catalyst was thereafter resumed and an analysis of the product stream was made after 5 minutes on stream. Comparison of the latter analysis with that of the product stream after an initial period of 5 minutes on stream and just prior to contact with the helium-HF stream was as follows:

| Product analysis | After 5 minutes on stream | After 60 minutes on stream and prior to HF contact | 5 minutes on stream after HF contact |
|---|---|---|---|
| iso-Butane | 0.7 | 7.1 | 0.3 |
| iso-Pentane | 0.6 | 6.1 | 0.1 |
| 2,2-dimethylbutane | 0.0 | 0.1 | 0.4 |
| 2-methylpentane and 2,3-dimethylbutane | 12.4 | 4.4 | 16.3 |
| 3-methylpentane | 3.4 | 1.2 | 3.7 |
| n-Hexane conversion | 17.1 | 18.9 | 20.8 |
| Selectivity to $C_4$, $C_5$ | 7.6 | 70.0 | 1.7 |

It can be seen from the above that the HF treatment did not appreciably affect conversion but substantially reduced the cracking reaction as evidenced by the smaller amounts of i-butane and i-pentane produced.

As mentioned, in one embodiment of the invention intermittent introduction of the hydrogen fluoride into contact with the catalyst is made. In that instance, the hydrogen fluoride is introduced into contact with the catalyst in the absence of the feedstream containing the paraffin. This introduction is continued for a period of time sufficient to reduce the cracking subsequently resulting when the hydrocarbon feedstream is introduced into contact with the catalyst in the absence of, the HF stream.

It will be evident from the foregoing that various modifications can be made to the method of this invention. Such are considered, however, to be within the scope thereof.

What is claimed is:
1. A method of isomerizing paraffin hydrocarbons, comprising:
   (a) introducing paraffin hydrocarbons into contact with a supported catalyst in a reaction zone to isomerize said paraffin hydrocarbons, said supported catalyst comprising $HSbF_6$;
   (b) terminating the introduction of the paraffin hydrocarbons into the reaction zone;
   (c) introducing anhydrous vaporous hydrogen fluoride into contact with said supported catalyst in the reaction zone for a time sufficient to change the selectivity of the said supported catalyst;
   (d) terminating the introduction of the anhydrous vaporous hydrogen fluoride into the reaction zone; and
   (e) introducing paraffin hydrocarbons into contact with the supported catalysts in the reaction zone to isomerize said paraffin hydrocarbons.
2. The method of claim 1 in which hydrogen is present in step (a) in an amount within the range of from about 0.1 to about 100 moles per mole of said hydrocarbon.
3. A method, as set forth in claim 1, wherein steps (a) through (e) are repeated at least once.

References Cited
UNITED STATES PATENTS

| | | | |
|---|---|---|---|
| 3,394,202 | 7/1968 | Oelderik | 260—683.68 |
| 3,201,494 | 8/1965 | Oelderik et al. | 260—683.68 |
| 3,617,516 | 11/1971 | Gooswilligen et al. | 260—683.68 |

DELBERT E. GANTZ, Primary Examiner

G. J. CRASANAKIS, Assistant Examiner